UNITED STATES PATENT OFFICE 2,492,972

P-NITRO-O-TRIFLUOROMETHYL BENZENE-AZO-N - β - CYANOETHYL-N-HYDROXYAL-KYLANILINE DYE COMPOUNDS

Joseph B. Dickey, Rochester, N. Y., assignor to Eastman Kodak Company, Rochester, N. Y., a corporation of New Jersey No Drawing. Application July 26, 1946, Serial No. 686,439

3 Claims. (Cl. 260—205)

This invention relates to new azo compounds and their application to the art of dyeing or coloring textile materials, such as filaments, threads, yarns or fabrics (knitted or woven) comprising a cellulose carboxylic ester.

I have discovered that the azo compounds having the general formula:

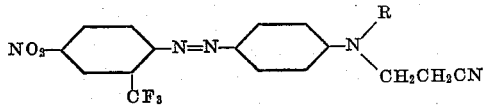

wherein R stands for the β-hydroxyethyl group, the β-hydroxypropyl group or the γ-hydroxypropyl group are unusually valuable dyes for coloring textile materials comprising cellulose carboxylic ester fibers, in which ester the acid radical contains from 2 to 4 carbon atoms. They are especially useful for the coloration of cellulose acetate textile materials.

The new azo compounds of my invention dye the aforesaid textile materials scarlet shades of exceptional fastness to light and gas. Their outstanding utility is apparent from the fact that they yield dyeings on cellulose acetate textile materials which are 3 to 5 times as fast to light as the dyeing obtained with the dye

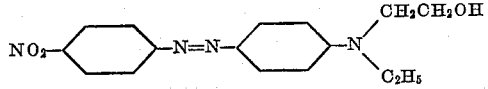

which is one of the best, if not the best, scarlet azo dyes now available for dyeing cellulose acetate textile materials.

Further, I have found that the dye compounds of my invention yield dyeings on cellulose acetate textile materials which are of greatly superior light fastness (usually 3 to 5 times) to the dyeings obtained on cellulose acetate textile materials with the dye having the formula:

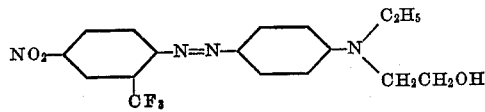

the dye having the formula:

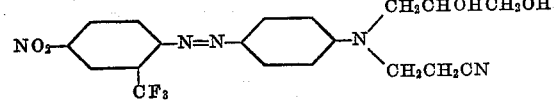

or the dyes having the general formula:

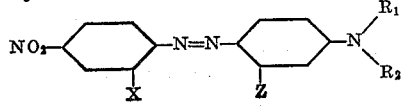

wherein X stands for a hydrogen atom, a chlorine atom, a bromine atom, a methyl group or a methoxy group, Z stands for a hydrogen atom, a methyl group, a methoxy group or an acetylamino group, $R_1$ stands for a β-hydroxyethyl group, a β-hydroxypropyl group, a γ-hydroxypropyl group or a β,γ-dihydroxypropyl group and $R_2$ stands for a β-cyanoethyl group, a methyl group, an ethyl group or a β-hydroxyethyl group.

In addition, the aqueous nitrous acid fastness properties of the dyeings obtained on cellulose acetate with the new dye compounds of the invention are considerably superior to that of the dyeings obtained with the scarlet azo dyes now available for dyeing cellulose acetate, as for example, p-nitrobenzeneazo-N-ethyl-N-β-hydroxyethylaniline, previously referred to. The advantages of my new dye compounds could not have been predicted.

It is an object of my invention to provide new azo dye compounds. Another object is to provide a satisfactory process for the preparation of the new azo dye compounds of my invention. A further object is to provide cellulose carboxylic ester textile materials colored with the new azo compounds of the invention. A particular object is to provide dyed cellulose acetate textile materials of outstanding fastness to light and gas.

The new azo dye compounds of my invention can be prepared by diazotizing 1-amino-2-trifluoromethyl-4-nitrobenzene and coupling the diazonium salt obtained with a compound having the formula:

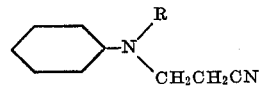

wherein R stands for the β-hydroxyethyl group, the β-hydroxypropyl group or the γ-hydroxypropyl group.

The following examples, in which parts are by weight, illustrate the compounds of the invention and the manner in which they can be prepared.

*Example 1.—Preparation of p-nitro-o-trifluoromethylbenzeneazo - N - β-cyanoethyl-N-β-hydroxyethylaniline*

3.8 parts of dry sodium nitrite are added slowly with stirring to 135 parts of sulfuric acid (sp. gr. 1.83) while maintaining the temperature of the reaction mixture below 70° C. When the sodium nitrite is completely dissolved, the reaction mixture is cooled to 10°–15° C. and 10.3 parts of dry powdered 1-amino-2-trifluoromethyl-4-nitrobenzene are added over a period of 15–20 minutes while maintaining the temperature below 25° C. The reaction mixture is stirred until all of the 1-amino-2-trifluoromethyl-4-nitrobenzene is completely broken up and diazotized (approximately 1 hour). 0.5 part of powdered sulfamic acid are added to destroy any excess nitrous acid present in the reaction mixture.

9.5 grams of N-β-hydroxyethyl-N-β-cyanoethylaniline are dissolved in 162 parts of 12½% aqueous sulfuric acid. The reaction mixture resulting is cooled to 0°-10° C. by adding 400 parts of crushed ice with stirring. The diazo solution prepared as described above is then added slowly with stirring. Coupling takes place immediately. Throughout the coupling reaction the temperature should be maintained at 10° C. or below and ice should be added as necessary to so maintain the temperature. Upon completion of the coupling reaction, the reaction mixture is permitted to stand for ½ hour after which it is slowly made neutral to Congo red paper by the addition of sodium carbonate and then allowed to stand for one hour. The dye compound formed is recovered by filtration, washed well with water and dried. It has the formula:

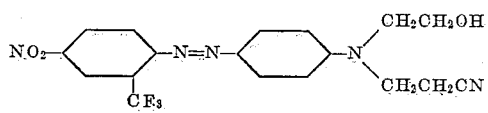

and dyes cellulose acetate textile materials scarlet shades from an aqueous suspension.

*Example 2.—Preparation of p-nitro-o-trifluoromethylbenzeneazo - N - β - cyanoethyl-N-β-hydroxypropylaniline*

This compound is prepared by substituting 9.7 grams of N-β-hydroxypropyl-N-β-cyanoethylaniline for N-β-hydroxyethyl-N-β-cyanoethylaniline in the reaction described in Example 1. The diazotization, coupling and dye recovery operations are carried out in accordance with the procedure of Example 1. The dye compound obtained has the formula:

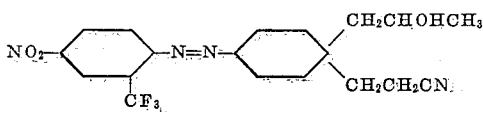

It colors cellulose acetate textile materials scarlet shades.

*Example 3.—Preparation of p-nitro-o-trifluoromethylbenzeneazo - N - β-cyanoethyl-N-γ-hydroxypropylaniline*

This dye compound is prepared by substituting 9.7 grams of N-γ-hydroxypropyl-N-β-cyanoethylaniline for N-β-hydroxyethyl-N-β-cyanoethylaniline in the reaction described in Example 1. The diazotization, coupling and dye recovery operations are carried out in accordance with the procedure described in Example 1. The dye compound obtained has the formula:

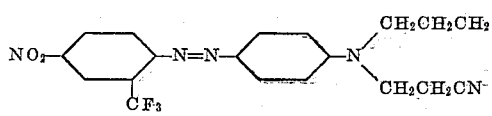

It dyes cellulose acetate textile material scarlet shades.

In order that the preparation of the dye compounds of my invention may be entirely clear, the preparation of the coupling components used in their manufacture is described hereinafter.

*Preparation of N-β-cyanoethyl-N-β-hydroxyethylaniline*

123 grams of N-β-hydroxyethylaniline, 53 grams of acrylonitrile and 10 cc. of glacial acetic acid are placed in a round-bottom flask and heated on a steam bath under a reflux condenser for 150 hours. The reaction mixture is then distilled through an efficient fractionating column (e. g. a Penn State column). 154 grams of N-β-cyanoethyl-N-β-hydroxyethylaniline boiling at 205-207° C./8 mm. are obtained. By the substitution of an equivalent gram molecular weight of N-β-hydroxypropylaniline and N-γ-hydroxypropylaniline for the N-β-hydroxyethylaniline of the foregoing example, N-β-cyanoethyl - N-β-hydroxypropylaniline and N-β-cyanoethyl-N-γ-hydroxypropylaniline, respectively, are obtained.

1-amino - 2 - trifluoromethyl-4-nitrobenzene (known also as 5-nitro-2-amino-benzotrifluoride) is a known compound and accordingly a description of its preparation is deemed unnecessary.

Cellulose carboxylic esters which are employed in the manufacture of textile materials include the partially hydrolysed as well as the unhydrolysed cellulose acetates, cellulose propionates and cellulose butyrates and the partially hydrolysed as well as the unhydrolyzed mixed esters of cellulose, such as cellulose acetate-propionate and cellulose acetate-butyrate. All of these cellulose carboxylic esters consist of a cellulose portion or radical and an acid radical which contains from 2 to 4 carbon atoms.

The azo dye compounds of my invention can be applied to the textile materials indicated hereinbefore in the form of an aqueous dispersion and are ordinarily so applied. To illustrate, the dye compound is finely ground with a dispersing agent such as Turkey red oil, sulfite cellulose solution, soap, or an oleyl glyceryl sulfate and the resulting paste is dispersed in water. The dye bath thus prepared is heated to a temperature approximating 45° C.–55° C. and the textile material to be dyed is immersed in the dyebath, following which the temperature is gradually raised to 80° C.–90° C. and maintained at this point until dyeing is complete, usually one half hour to two hours. Upon completion of the dyeing operation the textile material is removed from the dyebath, washed with soap, rinsed well with water and dried.

As the azo dye compounds of the invention possess good affinity for the textile materials named herein and dye these materials readily they can be used in jig dyeing operations in which somewhat lower temperatures (65° C.–75° C., for example) than those just mentioned, are ordinarily employed. Widely varying amount of dye can be used in the dyeing operation. The amount of dye used can be, for example, ⅓ to 3% (by weight) of that of the textile material although lesser or greater amounts of dye can be employed.

I claim:

1. The azo dye compounds having the general formula:

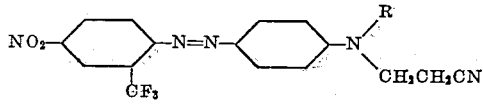

wherein R stands for a member selected from the group consisting of the β-hydroxyethyl group and the γ-hydroxypropyl group.

2. The azo dye compound having the general formula:
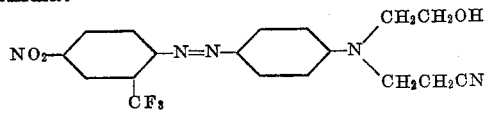
3. The azo dye compound having the general formula:
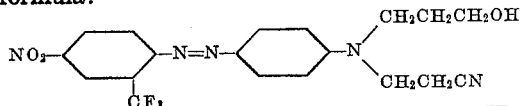
JOSEPH B. DICKEY.
REFERENCES CITED
The following references are of record in the file of this patent:
UNITED STATES PATENTS
| Number | Name | Date |
|---|---|---|
| 1,999,185 | Engelmann | Apr. 30, 1935 |
| 2,109,024 | Holzach et al. | Feb. 22, 1938 |
| 2,153,018 | Heyna | Apr. 4, 1939 |
| 2,173,053 | Hitch | Sept. 12, 1939 |
| 2,194,926 | Daudt | Mar. 26, 1940 |
| 2,194,927 | Daudt | Mar. 26, 1940 |
| 2,387,987 | Felix | Oct. 30, 1945 |
FOREIGN PATENTS
| Number | Country | Date |
|---|---|---|
| 188,205 | Switzerland | Dec. 15, 1936 |
| 640,404 | Germany | Jan. 4, 1937 |